United States Patent [19]

Chung et al.

[11] Patent Number: 5,728,765
[45] Date of Patent: Mar. 17, 1998

[54] GLASS FIBER-REINFORCED POLYCARBONATE MOLDING COMPOSITIONS HAVING IMPROVED IMPACT STRENGHT

[75] Inventors: James Y. J. Chung, Wexford; Nelson R. Lazear, McMurray, both of Pa.

[73] Assignee: Bayer Corporation, Pittsburgh, Pa.

[21] Appl. No.: 511,333

[22] Filed: Aug. 10, 1995

[51] Int. Cl.$^6$ ........................................... C08K 3/40
[52] U.S. Cl. ................ 524/494; 524/261; 524/267; 524/493; 524/537; 525/432; 525/464; 523/434; 523/437
[58] Field of Search ..................... 524/494, 493, 524/261, 267, 537; 525/439, 464; 523/434, 437

[56] References Cited

U.S. PATENT DOCUMENTS

| | | | |
|---|---|---|---|
| 3,751,519 | 8/1973 | Bostick et al. | 260/824 |
| 3,933,730 | 1/1976 | Hoogeboom | 260/37 |
| 4,147,707 | 4/1979 | Alewelt et al. | 260/37 |
| 4,197,384 | 4/1980 | Bialous | 525/464 |
| 4,358,556 | 11/1982 | van Abeelen | 524/267 |
| 4,866,123 | 9/1989 | Wittmann et al. | 525/67 |
| 5,087,662 | 2/1992 | Alsmarraie et al. | 525/63 |
| 5,153,238 | 10/1992 | Bilgrien et al. | 523/211 |

FOREIGN PATENT DOCUMENTS

| | | |
|---|---|---|
| 2083014 | 5/1993 | Canada . |
| 505869 | 9/1992 | European Pat. Off. . |
| 5086278 | 4/1993 | Japan . |
| 5262960 | 10/1993 | Japan . |

OTHER PUBLICATIONS

R. Buch et al, "Silicone–Base Additives for Thermoplastic Resin Providing improved Impact Strength Processing and Fire Retardant Synergy", (Dow Corning Corp.) Fire Retardant Chem Assoc., Oct. 26–29, 1993.

*Primary Examiner*—Edward J. Cain
*Attorney, Agent, or Firm*—Joseph C. Gil; Aron Preis

[57] ABSTRACT

The invention is based on the surprising and unexpected finding that the impact performance of a thermoplastic composition containing aromatic polycarbonate resin and glass fibers is improved upon incorporation therewith of a particular silicone rubber powder. The silicone rubber powder, added at a level of about 0.5 to 4 percent, relative to the weight of the composition, is characterized in that it contains a mixture of (a) a polydiorganosiloxane and (b) silica, said glass fibers being of the type which do not, per se, adhere to the polycarbonate matrix in which they are incorporated.

11 Claims, 1 Drawing Sheet

GLASS FIBER-REINFORCED POLYCARBONATE MOLDING COMPOSITIONS HAVING IMPROVED IMPACT STRENGHT

The invention concerns thermoplastic molding compositions and in particular glass-fibers-reinforced polycarbonate molding compositions.

The invention is based on the surprising and unexpected finding that the impact performance of a thermoplastic composition containing aromatic polycarbonate resin and glass fiber-reinforcing agents is improved upon the incorporation therewith of a particular silicone rubber powder. The silicone rubber powder, added at a level of about 0.5 to 4 percent, relative to the weight of the composition, is characterized in that it contains a mixture of (a) a polydiorganosiloxane and (b) silica said glass fibers being of the type which do not, per se, adhere to the polycarbonate matrix in which they are incorporated.

Thermoplastic aromatic polycarbonate resins are well known and are readily available in commerce. While the impact resistance of polycarbonates makes these resins the material of choice in a variety of demanding applications, attempts at improving this property continue. The literature includes a large number of patents directed to this subject. Reinforcing agents for polymeric matrices and for polycarbonate resins am well known; also commercial polycarbonate compositions which are reinforced with glass fibers are readily available in commerce. The silicone rubber powder of the invention is also well known. Of particular relevance in the present context is a paper by R. Buch et al "Silicone-Based Additives for Thermoplastic Resins Providing improved Impact Strength, Processing and Fire Retardant Synergy". This prior art paper (Dow Corning Corporation) disclosed certain Silicone Powder Resin Modifiers products termed RM 4-7081 and RM 4-7051 to be useful in reducing the rate of heat release and the evolution rates of smoke and carbon monoxide of burning plastics, including polycarbonate. The relevant properties of compositions containing 99 and 95% polycarbonate, the balance in each composition being RM 4-7081, are reported. Also disclosed is the impact strength improvement for engineering resins such as polyphenylene ether (PPE) and PPS. Improved impact strength of polycarbonate compositions is not reported.

Also related is Canadian patent application 2,083,014 which disclosed the silicone rubber powder of the present invention as a component in a composition containing poly(phenylene ether) resin.

Polycarbonate molding compositions which contain additive amounts of organosiloxane compounds are known: JP 5,262,960 is said to disclose a low viscosity polycarbonate resin composition which contain organo siloxane and a catalyst. The composition is said to exhibit lower melt viscosity and improved fluidity and moldability without loss of mechanical properties; JP 5,086,278 is considered to disclose an organosiloxane compound and a catalyst as additives to a polycarbonate resin. EP 505.869 disclosed a polycarbonate composition containing a siloxane compound, characterized in its high dimensional stability. Polycarbonate compositions containing a cyclosiloxane compound were disclosed in U.S. Pat. No. 3,751,519 to have good release properties. A thermal oxidative stabilized polycarbonate composition containing a hydrocarbonoxy siloxane compound has been disclosed in U.S. Pat. No. 4,197, 384.

It has now been discovered that certain silicone rubber powders, preferably produced in accordance with the procedure disclosed in U.S. Pat. No. 5,153,238 which is incorporated herein by reference, are useful as impact modifier in thermoplastic molding compositions containing polycarbonate and certain reinforcing agents.

DETAILED DESCRIPTION OF THE INVENTION

Figure 1:
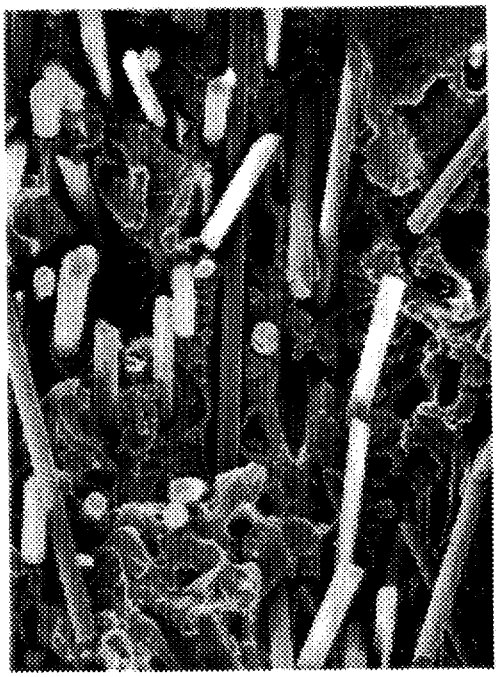
FIG. 1 is a scanning electron micrograph (magnification 215) of the fracture surface of an article molded of a composition containing only fibers and polycarbonate resin The micrograph evidences no adhesion in the interface between fibers and matrix. The glass fibers of this composition are suitable in the preparation of the inventive composition.

The inventive composition contains polycarbonate resin, a positive amount of up to about 40 percent, preferably about 5 to 30 percent by weight of glass fibers (as defined below) and about 0.5 to about 4, preferably about 1 to 3 percent of the silicone rubber powder.

The polycarbonate resins within the scope of the present invention include (co)polycarbonates and mixtures thereof.

The (co)polycarbonates generally have a weight average molecular weight of 10,000–200,000, preferably 20,000–80, 000 and their melt flow rate, per ASTM D-1238 at 300° C., is about 1 to about 65 g/10 min., preferably about 2–15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2.211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

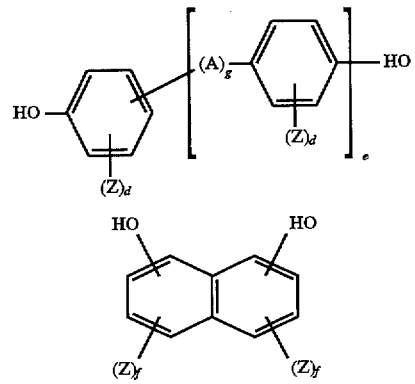

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

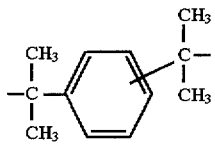

e and g both denote the number 0 to 1; Z denotes F, Cl, Br or C$_1$–C$_4$-alkyl and if several Z radicals are substituents in one aryl radical, they may be identical or different from one another; d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxy-phenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5–24, 13–16, 7.5–13.0 and 3.5–6.5 g/10 min., respectively. These are products of Bayer Corporation of Pittsburgh, Pa.

A polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

Reinforcing agents in the context of the present invention are glass fibers of the type which do not, per se, adhere to the polycarbonate matrix in which they are incorporated. Stated another way, fracture surfaces of articles molded of compositions which consist of only polycarbonate resin and suitable glass fibers, show under scanning electron microscope (SEM) at magnification of about 215, virtually no adhesion between the resin and glass fibers. A better appreciation of such lack of adhesion may be gained from examining FIG. 1 which is a relevant SEM photograph. Accordingly, the fracture surface show the interface of the glass fibers and matrix to evidence no adhesion.

The preferred glass fibers are in the form of chopped strands of long glass fibers, having average diameters in the range of from about 8 to 20 μm and an average length of about 3 to 6 mm. Both sized and unsized glass fibers may be used. Among the suitable glass fibers which are available commercially mention may be made of OCF's product which is available under the trade designation OCF415DF.

The silicone rubber powder of the invention has an average particle size of about 1 to 1000 microns and contains (i) 100 parts by weight (pbw) of a polydiorganosiloxane and (ii) about 10 to 80 pbw,preferably about 20 to 50 pbw of a finely divided silica filler.

The polydiorganosiloxane which is characterized in that its viscosity at 25° C. is about $10^6$ to $10^9$ centipoise is a (co)polymeric resin having siloxane structural units represented by the general formula

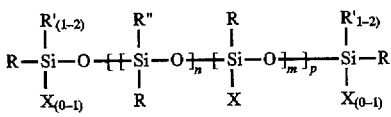

wherein R, R' and R" independently denote hydrogen, $C_{1-10}$-alkyl, alkenyl, cycloalkyl radicals or aryl groups, and where p is about 1000 to 8000, preferably about 3000–6000 and where the relative weight proportions of n and m are 98.5–100: 0–1.5, preferably 99:1, and where X denotes a member selected from the group consisting of

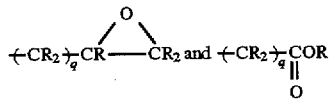

where R denotes hydrogen, $C_{1-10}$-alkyl, alkenyl, cycloalkyl radicals or aryl groups and where q is 1–10.

The organic groups of the polydiorganosiloxane, which may optionally be halogenated, are preferably lower alkyl radicals containing 1–4 carbon atoms, phenyl and halogen substituted alkyl radicals. Examples include resins containing dimethylsiloxy units, phenylmethylsiloxy units and dimethylsiloxy units and diphenyl siloxy units. Most preferably, the polydiorganosiloxane contains vinyl group(s) or epoxy group(s) at its chain termination(s) and/or along its main chain. The methods for the preparation of suitable polydiorganosiloxane are well known; a typical method comprise the acid- or base-catalyzed polymerization of cyclic diorganosiloxanes.

The silica filler required in the silicone rubber powder is a finely divided silica selected from among fumed silica and precipitated silica or silica gel. These are well known forms of silica and are readily available in commerce. The suitable silica is characterized in that its surface area is at least 50 $m^2/g$, preferably 50 to 900 $m^2/g$.

An additional embodiment entails use of treated silica which contains sites bonded to groups X as defined above; the manufacture of treated silica, typically by reacting the silanol groups on the silica surface with about 1–2% by weight of an organic alkyl halide compound or an organosilicon halide compound, is known in the art.

Among the suitable compounds mention may be made of low molecular weight liquid hydroxy- or alkoxy-terminated polydiorganosiloxanes, hexaorganosiloxanes and hexaorganosilazanes.

The procedure for the preparation of the silicone rubber powder has been described in detail in U.S. Pat. No. 5,153, 238 the specification of which is incorporated herein by reference. Suitable silicone rubber powder is available in commerce from Dow Corning Corporation under the trademark RM 4-7051 and RM 4-7081.

The preparation of the composition of the invention is carried out following conventional procedures and by use of conventional means such as single, preferably twin screw extruders. Conventional thermoplastic processes are suitable in molding useful articles from the inventive composition.

Conventional additives may be incorporated in the composition of the invention in the usual quantities. Mention may be made of a thermal stabilizer, a mold release agent, a pigment, a flame retarding agent, a uv stabilizer, a hydrolysis stabilizer, a gamma radiation stabilizer and a plasticizer for polycarbonate compositions.

EXAMPLES

Compositions within the scope of the invention, Examples B and C below, have been prepared and their properties determined as summarized below. In preparing the compositions, the polycarbonate resin was Makrolon 2608 polycarbonate, a product of Bayer (a homopolymer based on bisphenol A, having a melt flow rate of about 11 g/10 min. determined in accordance with ASTM D -1238). The silicon powder was Dow Corning's 4-7051 and the glass fibers were OCF415DF. The relative amounts of the components is in percent by weight. A summary of the tests is presented in the table below. FIG. 1 shows the fracture surface of an article molded of Example A.

| Example | A | B | C |
| --- | --- | --- | --- |
| Polycarbonate, % | 86.0 | 85.0 | 84.0 |
| glass fibers, % | 14.0 | 14.0 | 14.0 |
| silicone powder, % | 0.0 | 1.0 | 2.0 |
| melt flow rate, g/10 min. | 9.0 | 9.0 | 8.5 |
| impact strength, ft. lb/inch notched Izod @ ⅛" | 1.6 | 2.4 | 3.4 |

Figure 2:
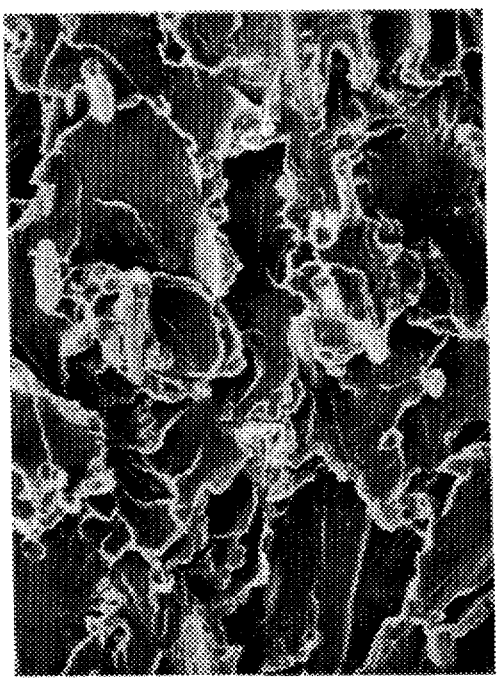
FIG. 2 is a micrograph (X212) of the corresponding fracture surface of an article molded of a composition containing only polycarbonate resin and glass fibers which are outside the scope of the present invention; there is considerable adhesion of the glass fibers to the matrix. These fibers are outside the scope of the instant invention.

A corresponding set of examples which except for the glass fibers was identical in all respects to the above was prepared and determined. In these, examples D, E and F below, the glass fibers were EPG 3090 glass fibers which are outside the scope of the present invention. Scanning electron micrograph of the fracture surface of an article molded of composition D is shown in FIG. 2. Clearly, in this composition which contain only glass fibers and polycarbonate matrix, there is considerable adhesion of glass fibers to the matrix indicating these fibers to be outside the scope of the instant invention.

| Example | D | E | F |
| --- | --- | --- | --- |
| Polycarbonate, % | 86.0 | 85.0 | 84.0 |
| glass fibers, % | 14.0 | 14.0 | 14.0 |
| silicone powder, % | 0.0 | 1.0 | 2.0 |
| melt flow rate, g/10 min. | 9.1 | 8.8 | 9.2 |
| impact strength, ft. lb/inch notched Izod @ ⅛" | 1.1 | 1.4 | 1.6 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising (a) a polycarbonate resin, and (b) a positive amount of up to 40 percent glass fibers and (c) about 0.5 to 4 percent silicone rubber powder, said percent both occurrences being relative to the weight of the composition, said silicone rubber powder having an average particle size of about 1 to 1000 microns and containing (i) 100 pbw of a polydiorganosiloxane having a viscosity at 25° C. is about $10^6$ to $10^9$ centipoise and siloxane structural units represented by the general formula

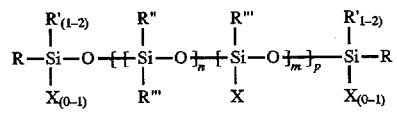

wherein R, R" and R'" independently denote a hydrogen atom, $C_{1-10}$-alkyl, alkenyl, cycloalkyl radicals or aryl groups, and where p is about 1000 to 8000 and where the relative weight proportions of n and m is 98.5–100: 0–1.5, and where X denotes a member selected from the group consisting of

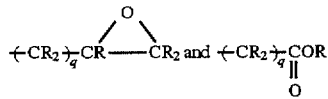

where R denotes hydrogen, $C_{1-10}$-alkyl, alkenyl, cycloalkyl radicals or aryl groups and where q is 1–10, and (ii) about 10 to 80 pbw of a finely divided silica selected from among fumed silica, precipitated silica and silica gel having a surface area of at least 50 m²/g, wherein said glass fibers do not, per se, adhere to the polycarbonate matrix in which they are incorporated.

2. The composition of claim 1 wherein said hydrocarbon radical is selected from the group consisting of $C_{1-10}$ alkyl radicals; alkenyl radicals; cycloalkyl radicals; and aromatic hydrocarbon radicals.

3. The composition of claim 2 wherein said hydrocarbon radical is a lower alkyl radical containing 1–4 carbon atoms or a phenyl radical.

4. The composition of claim 1 wherein said silica has a surface area of about 50 to 900 m²/g.

5. The composition of claim 1 wherein said p is about 5000–6000.

6. The composition of claim 1 wherein the relative weight proportions of n and m is 99:1.

7. A thermoplastic molding composition comprising (a) a polycarbonate resin, and (b) about 5 to 30 percent glass fibers and (c) about 1 to 3 percent silicone rubber powder, said percent both occurrences being relative to the weight of the composition, said silicone rubber powder having an average particle size of about 1 to 1000 microns and containing (i) 100 pbw of a polydiorganosiloxane having a viscosity at 25° C. is about $10^6$ to $10^9$ centipoise and siloxane structural units represented by the general formula

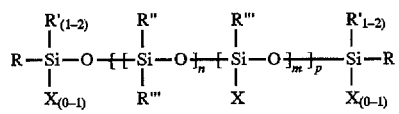

wherein R', R" and R'" independently denote a hydrogen atom, $C_{1-10}$-alkyl, alkenyl, cycloalkyl radicals or aryl groups, and where p is about 1000 to 8000 and where the relative weight proportions of n and m is 98.5–100: 0–1.5, and where X denotes a member selected from the group consisting of

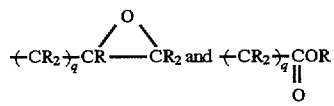

where R denotes hydrogen, $C_{1-10}$-alkyl, alkenyl, cycloalkyl radicals or aryl groups and where q is 1–10, and (ii) about 20 to 50 pbw of a finely divided silica selected from among fumed silica, precipitated silica and silica gel having a surface area of at least 50 m²/g wherein said glass fibers do not, per se, adhere to the polycarbonate matrix in which they are incorporated.

8. The composition of claim 7 wherein said silica has a surface area of about 50 to 900 m²/g.

9. The composition of claim 7 wherein the relative weight proportions of n and m is 99:1.

10. The composition of claim 1 wherein said silica contains sites bonded to said X.

11. The composition of claim 1 further containing at least one member selected from the group consisting of a thermal stabilizer, a mold release agent, a pigment, a flame retarding agent, a uv stabilizer, a hydrolysis stabilizer, a gamma radiation stabilizer and a plasticizer.

* * * * *